United States Patent
Schmitt et al.

(10) Patent No.: US 10,940,436 B2
(45) Date of Patent: Mar. 9, 2021

(54) METHOD OF CONTROLLING AMMONIA LEVELS IN CATALYTIC UNITS

(71) Applicant: DELPHI TECHNOLOGIES IP LIMITED, St. Michael (BB)

(72) Inventors: Julien Schmitt, Kuntzig (FR); Michael Parmentier, Chatillon (BE)

(73) Assignee: DELPHI TECHNOLOGIES IP LIMITED

(*) Notice: Subject to any disclaimer, the term of this patent is extended or adjusted under 35 U.S.C. 154(b) by 762 days.

(21) Appl. No.: 14/780,080

(22) PCT Filed: Mar. 25, 2014

(86) PCT No.: PCT/EP2014/055926
§ 371 (c)(1),
(2) Date: Sep. 25, 2015

(87) PCT Pub. No.: WO2014/154669
PCT Pub. Date: Oct. 2, 2014

(65) Prior Publication Data
US 2016/0045869 A1    Feb. 18, 2016

(30) Foreign Application Priority Data
Mar. 27, 2013 (EP) .................... 13161246

(51) Int. Cl.
*B01D 53/94*  (2006.01)
*F01N 3/20*  (2006.01)
*G05B 19/04*  (2006.01)

(52) U.S. Cl.
CPC ..... *B01D 53/9495* (2013.01); *B01D 53/9418* (2013.01); *F01N 3/208* (2013.01);
(Continued)

(58) Field of Classification Search
CPC ........... B01D 53/9418; B01D 53/9477; B01D 53/9495; B01D 2251/2067;
(Continued)

(56) References Cited

U.S. PATENT DOCUMENTS

| 2009/0272105 A1* | 11/2009 | Chi .................... B01D 53/9409 60/295 |
| 2010/0107609 A1 | 5/2010 | Parmentier et al. |

FOREIGN PATENT DOCUMENTS

EP    2 354 486 A1    8/2011

OTHER PUBLICATIONS

"Urea-SCR: a promising technique to reduce NOx emissions from automotive diesel engines" Koebel et al. Catalysis Today vol. 59, Issues 3-4, Jun. 25, 2000, pp. 335-345.*
(Continued)

*Primary Examiner* — Shogo Sasaki
(74) *Attorney, Agent, or Firm* — Joshua M. Haines

(57) ABSTRACT

A system of controlling ammonia levels in a catalytic exhaust system comprising:

means to provide a target value for ammonia slip/ammonia output from said system or a catalytic unit of said system; first comparison means to compare said target value with a feedback value to provide a command value based on said comparison, and means to control the dosing of a reducing agent such as urea into said exhaust system based on said command value;

means to input said command value to a transfer function or model to provide an estimated value of ammonia slip/ammonia output from said catalytic unit/system; means to measure actual ammonia slip/ammonia output from said unit/system; second comparison means to compare said
(Continued)

actual value with said estimated value; means to provide said feedback value based on the output from said comparison means.

21 Claims, 6 Drawing Sheets

(52) U.S. Cl.
CPC .......... *G05B 19/04* (2013.01); *B01D 53/9477* (2013.01); *B01D 2251/2067* (2013.01); *B01D 2255/911* (2013.01); *B01D 2258/012* (2013.01); *F01N 2560/021* (2013.01); *F01N 2610/02* (2013.01); *F01N 2900/0408* (2013.01); *F01N 2900/1616* (2013.01); *G05B 2219/2623* (2013.01); *Y02T 10/12* (2013.01)

(58) Field of Classification Search
CPC ........ B01D 2255/911; B01D 2255/801; B01D 2258/012; F01N 3/208; F01N 2560/021; F01N 2610/02; F01N 2900/0408; F01N 2900/1616; G05B 19/04; G05B 2219/2623; Y02T 10/24
See application file for complete search history.

(56) References Cited

OTHER PUBLICATIONS

"Selective ammonia exhaust gas sensor for automotive applications" Moos et al. Sensors and Actuators B: Chemical vol. 83, Issues 1-3, Mar. 15, 2002, pp. 181-189.*
International Search Report dated Jun. 24, 2014.

* cited by examiner

METHOD OF CONTROLLING AMMONIA LEVELS IN CATALYTIC UNITS

CROSS REFERENCE TO RELATED APPLICATIONS

This application is a national stage application under 35 U.S.C. 371 of PCT Application No. PCT/EP2014/055926 having an international filing date of 25 Mar. 2014, which designated the United States, which PCT application claimed the benefit of European Patent Application number 13161246.7 filed on 27 Mar. 2013, the entire disclosure of each of which are hereby incorporated herein by reference.

TECHNICAL FIELD

This disclosure relates to catalytic (reduction) systems such as Selective Catalytic Reduction (SCR) systems and in particular but not exclusively, relates to the control of dosing of reducing agents, such as urea, to control ammonia levels in catalytic units of catalytic systems of vehicle exhausts.

BACKGROUND OF THE INVENTION

In known methods of controlling Selective Catalytic Reduction (SCR) catalyst units, the correct amount of a reducing agent (such as urea) is injected upstream of an SCR unit, whereafter it is converted into ammonia. Sufficient ammonia levels in SCR units are required to provide maximum NOx conversion efficiency; however it is also important to keep ammonia levels output from the exhaust (slip) to low values.

In order to meet emission legislation, SCR catalysts require closed loop control in order to correct for deviations that may arise due to catalyst aging, urea injector drift, urea quality change, and such like. NOx sensors are widely used to perform this closed loop control. It is known to also to use ammonia sensors to control urea dosing in SCR systems instead of a conventional NOx sensor, also by means of closed-loop control.

There are two main ways in which ammonia sensing is currently used in closed loop control of catalytic systems. In one, an ammonia sensor is utilized in conjunction with a NOx sensor to provide for ammonia measurement such that the exhaust gas composition can be fully characterized. A NOx sensor, sensitive to both NOx and ammonia, is compensated with an ammonia sensor signal. The control thus relies on accurate NOx and ammonia measurements to consequentially adjust the urea dosing appropriately.

It is an object of the invention to provide an efficient method and system to control of ammonia (slip) which is accurate and effective. It is another object of the invention to provide such control which does not require significant processing power and furthermore utilizes the minimum of sensors.

SUMMARY OF THE INVENTION

In one aspect of the invention is provided a method of controlling ammonia levels in a catalytic exhaust system comprising: i) providing a target value for ammonia slip/ammonia output from said system or a catalytic unit of said system; ii) comparing said target value with a feedback value to provide a command value based on said comparison, said command value being used to control the dosing of a reducing agent into said exhaust system; iii) inputting said command value to a transfer function or model to provide an estimated value of ammonia slip/ammonia output from said catalytic unit/system; iv) measuring actual ammonia slip/ammonia output from said unit/system; v) comparing said actual value from iv) with said estimated value from step iii) vi) providing said feedback value in ii) based on said comparison in v).

The transfer function is preferably a slip model of said catalytic system/unit. Preferably the transfer function is a first order lag function. The transfer function may include one or more of the following parameters: measured or estimated exhaust gas flow, catalyst temperature and ammonia level within said catalytic system/unit.

The time constant of the first order lag function may be $$\tau = \frac{1}{k \cdot m_{exh}}$$

where $m_{exh}$ is the measured or estimated exhaust gas flow.

The feedback value may be provided by applying a further transfer function to the difference from the comparison in step v). The further transfer function may be a first order lag filter.

The reducing agent may be urea. The method may include converting said command signal into a signal for urea injection/dosing means.

The method may include supplementing said signal for urea injection/dosing means with a further signal for urea injection/dosing means provided from open loop control. The open loop control may have one or more input parameters selected from: NOx level output from exhaust and/or an engine; exhaust mass flow; and catalyst temperature.

In a further aspect is provided a system of controlling ammonia levels in a catalytic exhaust system comprising: means to provide a target value for ammonia slip/ammonia output from said system or a catalytic unit of said system; first comparison means to compare said target value with a feedback value to provide a command value based on said comparison, and means to control the dosing of a reducing agent into said exhaust system based on said command value; means to input said command value to a transfer function or model to provide an estimated value of ammonia slip/ammonia output from said catalytic unit/system; means to measure actual ammonia slip/ammonia output from said unit/system; second comparison means to compare said actual value with said estimated value; means to provide said feedback value based on the output from said comparison means.

BRIEF DESCRIPTION OF THE DRAWINGS

The present invention will now be described, by way of example, with reference to the accompanying drawings, in which:

FIG. 1 shows schematically the components used in a selective catalytic reduction system. It shows an engine 1 having an exhaust system 2 which includes a Diesel Oxidation Catalyst (DOC) unit 3, SCR Catalyst on Diesel Particulate unit, (SCRF) 4, as well as an SCR catalyst unit 5. A dosing injector 6 is included between the DOC and SCRF units, and is supplied from a Urea Delivery Module 7, which includes an SCR tank 8. The urea supply is via an electrically heated feed line 9. The dosing injector is adapted to inject urea into the exhaust system upstream of the SCRF unit. As the dosing injector is located adjacent to the exhaust system, in order to cool it, it is supplied with water from a (e.g. the engine) cooling system; the cooling system may include a heat exchanger/radiator 10. The dosing injector is controlled by an SCR driver module 11, which is further controlled by an engine Electronic Control Unit (ECU) 12.

When urea is injected into the exhaust, it is converted into ammonia. In the SCRF, ammonia converts NOX gases into nitrogen and water. In order to function efficiently, the SCRF unit needs to operate close to full ammonia capacity. However, as it is undesirable to emit ammonia through the exhaust, an optional SCR catalyst unit is incorporated to break down the ammonia. An ammonia sensor 13 and controller 14 may be included; these may be in communication with the ECU and the SCR driver module.

DESCRIPTION OF THE PREFERRED EMBODIMENTS

According to examples, a single ammonia sensor is used to implement control of urea dosing/injection to provide the requisite level of ammonia in an SCRF or other catalytic unit. The control can be used for both steady state and transient operation. The ammonia levels in the SCR catalyst unit is preferably maintained to a level where optimum NOx conversion efficiency is achieved. Ammonia slip, that is the ammonia coming out of the SCRF unit, may be present and is preferably measurable by an ammonia sensor; this would be the case when the ammonia storage sites are almost saturated with ammonia. NOx reduction with ammonia occurs at the surface of the catalyst, with the stored ammonia.

Adding a second catalyst (SCR or clean-up catalyst) downstream of the first SCR can prevent ammonia from slipping out of the tailpipe, while improving further the NOx conversion efficiency. Such systems are also compatible with the described invention.

Figure 2A:
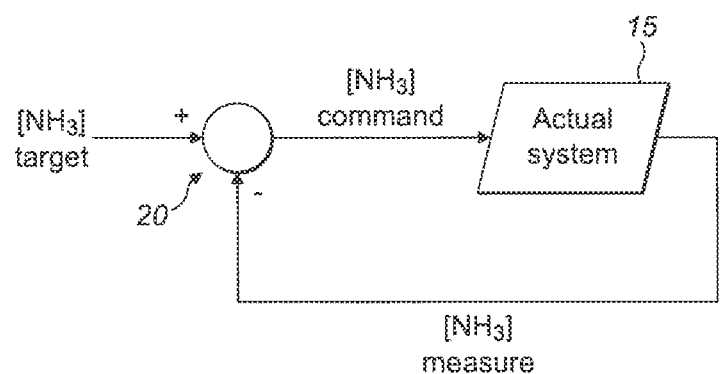
FIG. 2a shows a simple prior art system used to control dosing of a reducing agent.
Figure 2B:
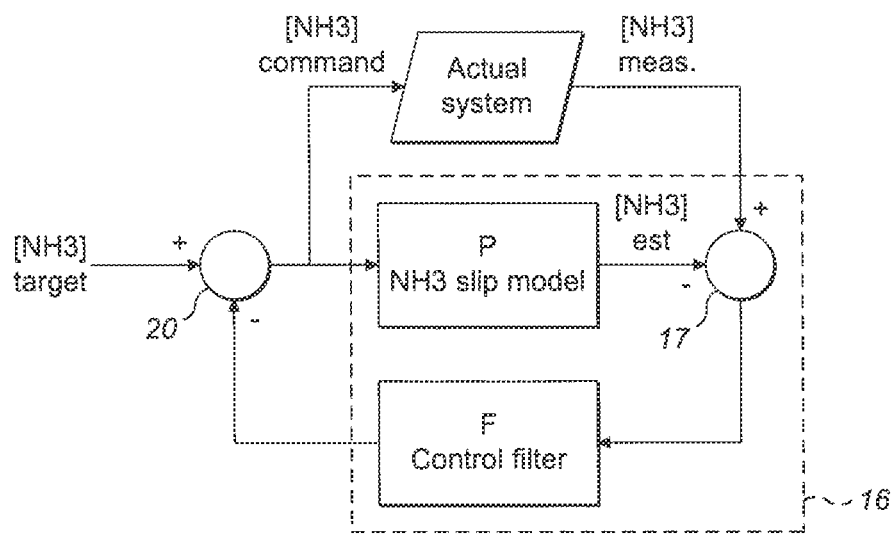
FIG. 2b shows a control system used to control dosing of a reducing agent according to one example.

A conventional control system is shown in FIG. 2a, for comparison with a control system according to one example, shown in FIG. 2b. In the conventional system, an ammonia target level is set, which maybe set by, or loaded onto, an engine control unit. This provides an input into the actual (real) system 15, and urea dosing should be adjusted accordingly so as to maintain desired ammonia levels in the slip. An ammonia sensor located appropriately (e.g. just downstream of the catalytic/SCR unit) measures the ammonia levels, and in closed loop control, feeds back a signal representative of the ammonia, such that the demand and actual values of ammonia levels are compared at 20. The urea dosing is appropriately controlled based on this comparison to vary the command value, and appropriately control the urea dosing unit.

FIG. 2b shows an embodiment according to one example, which includes a further closed loop control 16 generally designated by the broken line. As before, a target ammonia level is set, and is input into the control system. This again is compared with a feedback level at 20 to provide a command level (signal) which is input to the actual system. The command signal is additionally fed into a transfer function P. The transfer function may be regarded as a model or a "slip buffer". It would be clear to the skilled person how such a transfer function P can be provided and implemented. The transfer function models and relates urea injection/command to ammonia slip; it is preferably modeled in a calculation effective manner.

The slip model (or transfer function) P provides an estimated value of ammonia levels in the slip. This is then compared with the actual (measured value) at 17 to provide a feedback signal which is then compared with the target value at 20 to adjust the control of urea, as shown. The transfer function P is preferably a first order lag filter with a time constant inversely proportional to the exhaust mass flow.

In the example shown, the feedback loop preferably includes a further transfer function F, which in preferred examples, may be a first order lag filter.

In the control structure below, F is also preferably a first order lag filter, with a fixed calibratable time constant so as to ensure control stability and rapid perturbation rejection. As the transfer function P effectively embeds the dynamic model of the catalytic system/unit, calibration of the transfer function F is straightforward, and is independent of the characteristic of the system, already implemented in P.

In a preferred embodiment, as mentioned, the transfer function P is a first order lag filter with a time constant, $\tau$, which is inversely proportional to the exhaust mass flow $m_{exh}$, see below:

$$\tau = \frac{1}{k \cdot m_{exh}}$$

The transfer function results from a phenomenological physical model, where the ammonia released from the storage sites is instantaneously accumulated in a said slip buffer. This slip buffer is then progressively emptied with a rate proportional to the exhaust mass flow and proportional to the level of the slip buffer (SlipBuff). The following equation describes thus how, according to one example, the catalytic unit can be modeled in terms of the parameters of ammonia:

$$\frac{dSlipBuff}{dt} = NH3_{excess} - k \cdot m_{exh} \cdot SlipBuff$$

$NH3_{excess}$ is the ammonia slip rate resulting from excessive injection; that is the ammonia flow in excess of the converted ammonia flow. In sever thermal transients, significant ammonia stored in the SCR can slip but in simple examples this is not considered. When ammonia heavily desorbs from the SCR due to the temperature for example, the control may be temporarily disabled.

The time lag constant may be inversely proportional to the exhaust mass flow. Preferably the equation below provides the transfer function P which, as mentioned, is preferably implemented as a first order filter of time constant, τ:

$$\tau = \frac{1}{k \cdot m_{exh}}$$

Figure 3:
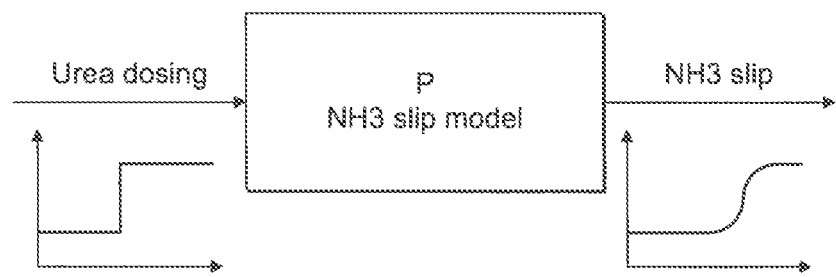
FIG. 3 shows an example of a slip model which may be used to provide a function of the control system according to a preferred aspect.

Using such a transfer function provides simple modeling of the complex transient behaviour of the ammonia release. The control thus relies on an internal model control structure, where the transfer function P is used to implement the model. FIG. 3 shows a representation of the model and how a first order transfer function implements the characteristics of the model.

Figure 4:
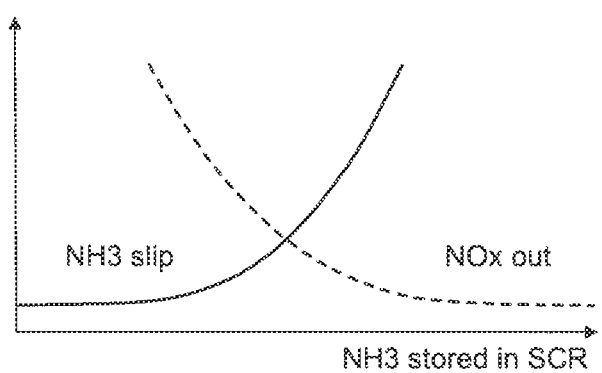
FIG. 4 shows how ammonia slip and NOx output vary with ammonia levels in an SCR unit.

The target ammonia slip may also be mapped as a function of catalyst temperature and calibrated to achieve the best compromise between NOx conversion efficiency and ammonia slip; see FIG. 4. The closed loop controller effectively corrects errors between the estimated ammonia slip and the target slip.

Figure 1:
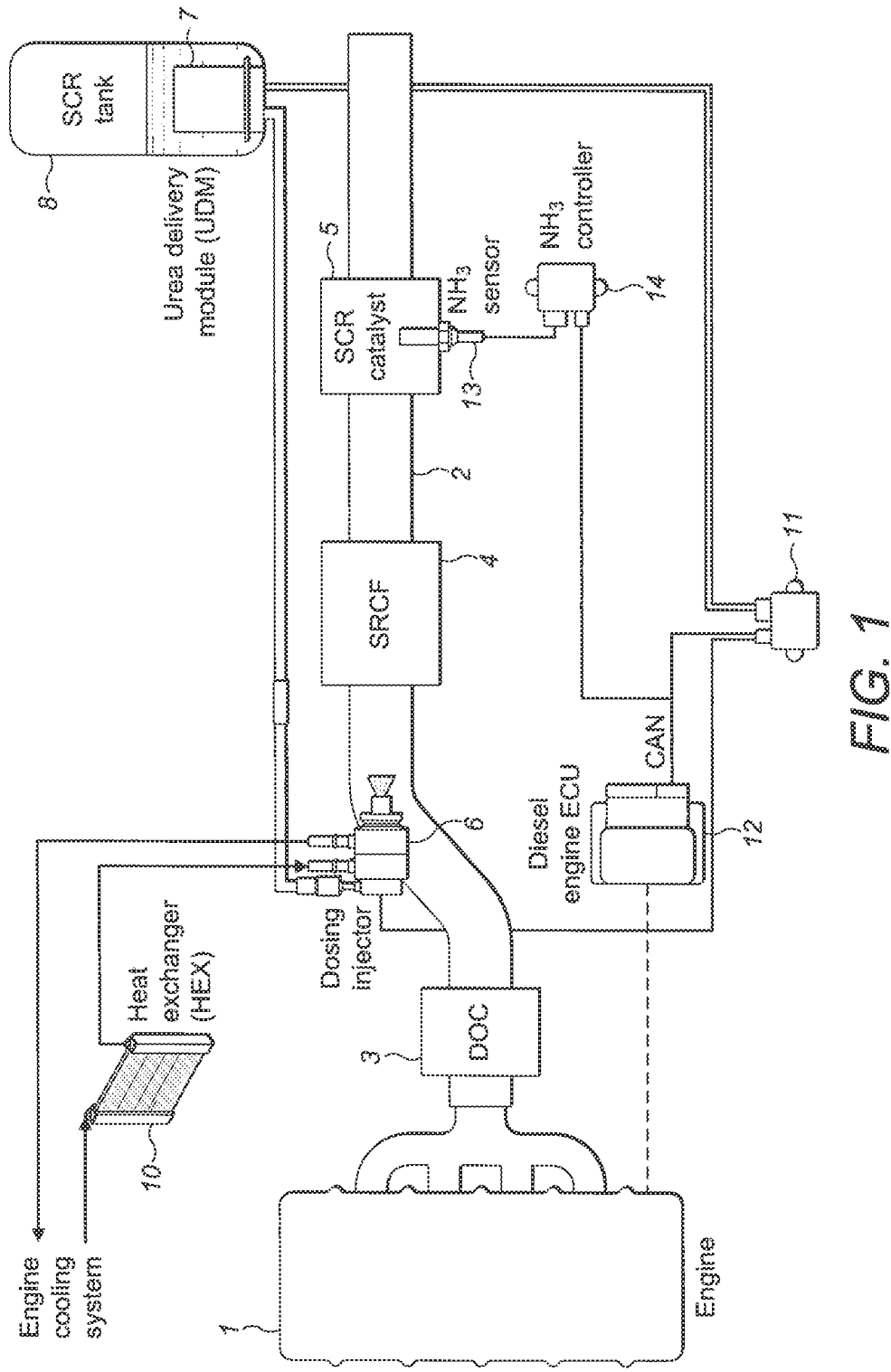
FIG. 1 shows schematically the components used in a selective catalytic reduction system for a vehicle exhaust system.
Figure 5:
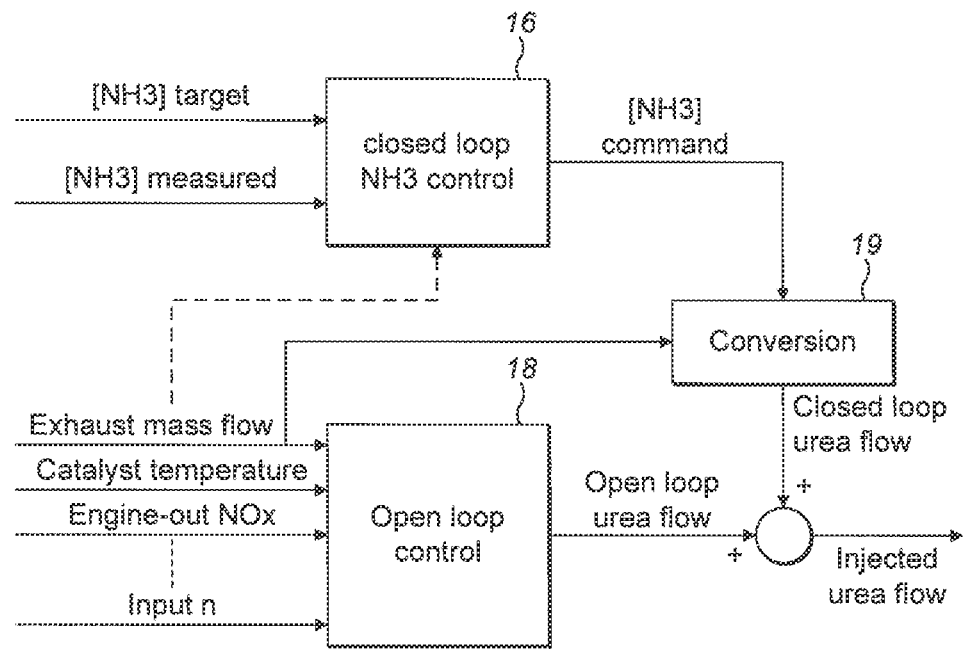
FIG. 5 shows how a closed loop control of urea dosing can be used in conjunction with open loop control according to an example.
Figure 6:
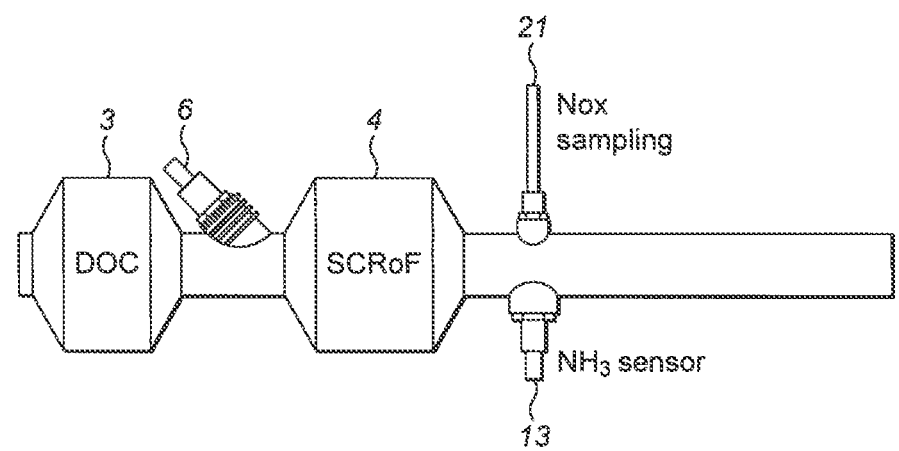
FIG. 6 shows a schematic figure of the sensors used to implement the FIG. 5 embodiment.

The closed loop control disclosed above can also be used in conjunction with open loop control to control dosing/injection of, e.g. urea, as illustrated in FIG. 5. FIG. 6 shows a schematic figure of the location of sensors and such like used to implement or test such a combined system, and components include like reference numerals to FIG. 1. A NOx probe 21 may also be included for testing. The closed loop control unit 16 represents the above described closed loop system, having a target and measured value of ammonia slip as inputs to provide a command value with respect ammonia. This is then converted by convertor 19 into a value for urea flow/injection for the urea dosing unit. The parameter of exhaust mass flow may be input and used by the convertor also. Any appropriate mapping can be used to implement this. As mentioned, this is used to control urea dosing and the skilled person would be aware of how to implement control methodology to control urea based on this. In the figure, the control of urea dosing is also dependent on open loop control inputs/signals from open loop control unit 18. The inputs to the open loop control unit in the example are exhaust mass flow, catalyst temperature, NOx levels output from the engine, and such like. The inputs are not limited to these, and can be either measured and/or provided by the ECU.

It is also noted that any of these inputs may be input also to the closed loop control unit 16 as shown by the dashed arrow (this is to provide the model within the closed loop control with additional parameters as explained).

The output of the open loop control is a urea flow demand signal. This supplements the urea flow control (demand) signal from the closed loop control to produce a demand signal for the injection of urea upstream of the catalytic unit.

FIGS. 6 and 7 show graphs illustrating show the results when a combined control methodology similar to that described with reference to FIG. 5, was applied to a closed-coupled SCR coated filter catalytic system so as to maintain the stable tailpipe NOx emissions when applying deviations to the dosing system. EURO 6 is the coming release of the European emission legislation (the current one is EURO5). This legislation specifies maximum tailpipe emissions for HC, CO, NOx, particulate matter (PM) on a predefined emission cycle.

Figure 7A:
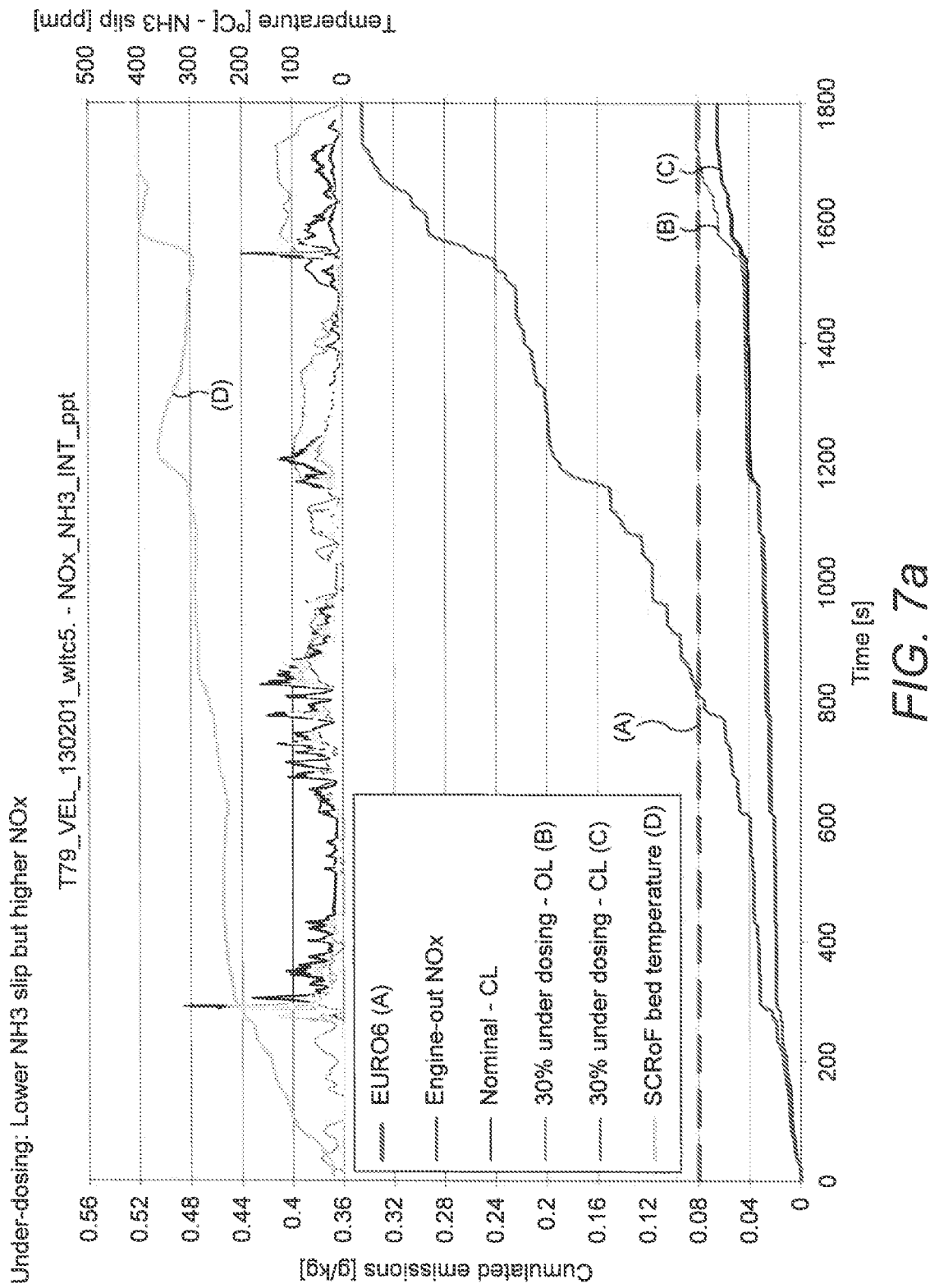
FIGS. 7a and b show the results of implementing examples of the invention for over-dosing and under-dosing respectively.
Figure 7B:
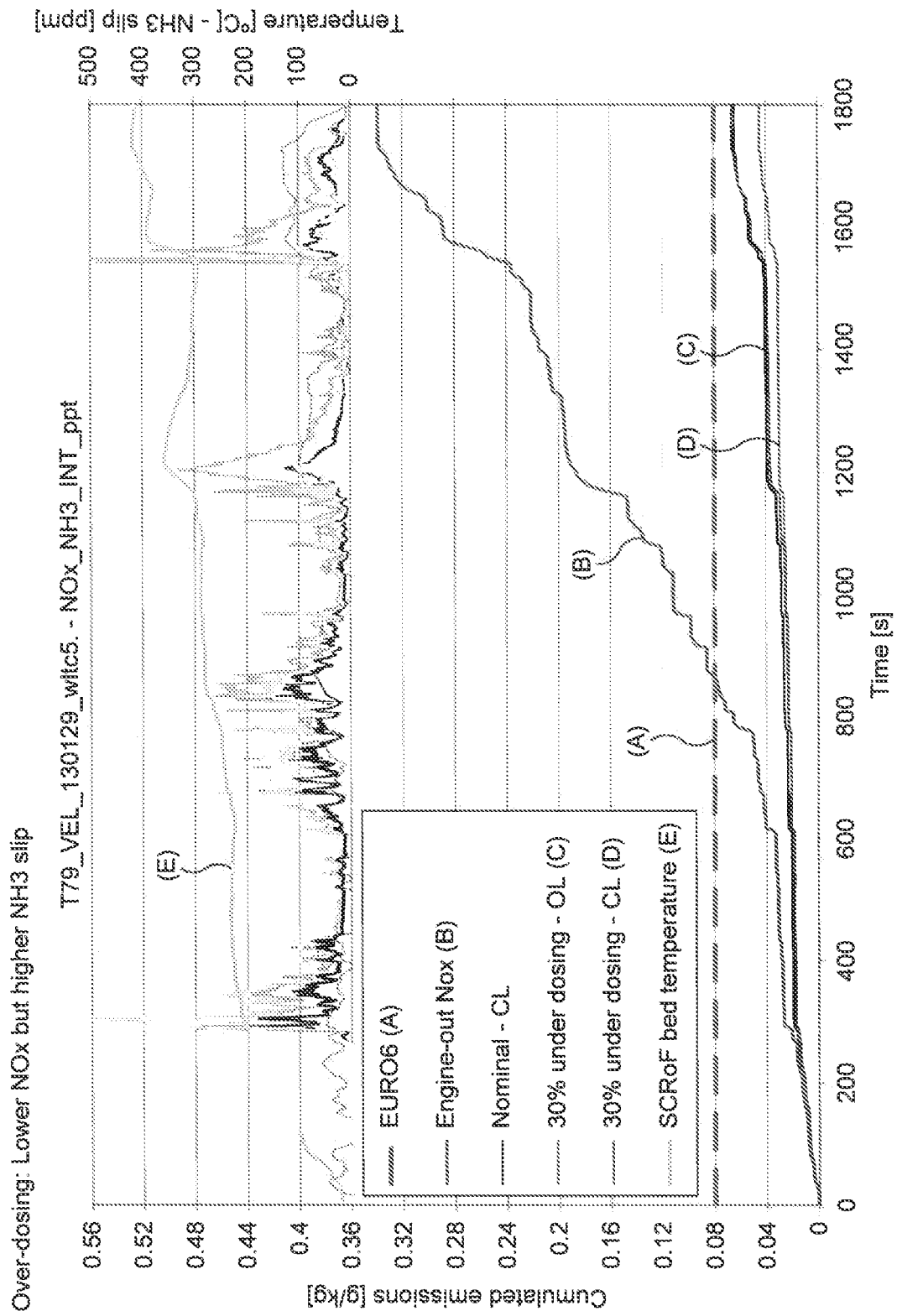

The shown NOx and ammonia emissions are both measured downstream of the SCRF (SCR on Filter) catalyst. FIGS. 7a and 7b show respectively under- and over-dosing by 30% and how the closed loop brings back the NOx emissions back to the nominal emissions (without any deviation). The charts also show how the ammonia slip comes back to nominal levels when the closed-loop is activated.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method of dosing reducing agent in a catalytic exhaust system comprising:
   i) providing a target value for ammonia slip/ammonia output from said system or a catalytic unit of said system, wherein said target value is provided to an electronic controller;
   ii) dosing reducing agent into said exhaust system with a dosing injector based on a command value supplied to said dosing injector;
   iii) inputting said command value to a transfer function or model, in said electronic controller, to provide an estimated value of ammonia slip/ammonia output from said catalytic unit/system;
   iv) measuring actual ammonia slip/ammonia output from said unit/system using an ammonia sensor and communicating the measured actual ammonia slip/ammonia output to said electronic controller;
   v) comparing said actual value from iv) with said estimated value from step iii), using said electronic controller to provide a feedback value;
   vi) comparing, using said electronic controller, said target value with said feedback value; and
   vii) controlling dosing of reducing agent into said exhaust system using said dosing injector based on the comparison of step vi).

2. A method as claimed in claim 1 wherein said transfer function is a first order lag function.

3. A method as claimed in claim 2 where the time constant of the first order lag function is $$\tau = \frac{1}{k \cdot m_{exh}}$$

where $m_{exh}$, is the measured or estimated exhaust gas flow.

4. A method as claimed in claim 1 wherein said transfer function or said model includes one or more of the following parameters: measured or estimated exhaust gas flow, catalyst temperature and ammonia level within said catalytic system/unit.

5. A method as claimed in claim 1 wherein said feedback value is provided by applying a further transfer function to the difference from the comparison in step v).

6. A method as claimed in claim 5 wherein said further transfer function is a first order lag filter.

7. A method as claimed in claim 1 wherein said reducing agent is urea.

8. A method as claimed in claim 1, including supplementing said command value for said dosing injector with a further signal for said dosing injector provided from open loop control.

9. A method as claimed in claim 8 wherein said open loop control has one or more input parameters selected from: NOx level output from exhaust and/or an engine; exhaust mass flow; and catalyst temperature.

10. A system of controlling dosing reducing agent in a catalytic exhaust system comprising:
- means to provide a target value for ammonia slip/ammonia output from said system or a catalytic unit of said system to an electronic controller;
- a dosing injector which doses reducing agent into said exhaust system based on a command value supplied to said dosing injector;
- means to input said command value to a transfer function or model, in said electronic controller, to provide an estimated value of ammonia slip/ammonia output from said catalytic unit/system;
- means to measure actual ammonia slip/ammonia output from said unit/system and communicate the measured actual ammonia slip/ammonia output to said electronic controller;
- comparison means to compare said actual value with said estimated value to provide a feedback value;
- second comparison means to compare said target value with said feedback value such that this comparison is used; and
- means to control dosing of reducing agent into said exhaust system using said dosing injector based on the comparison made by the second comparison means.

11. A system as claimed in claim 10 wherein said transfer function is a slip model of said catalytic system/unit.

12. A system as claimed in claim 10 wherein said transfer function is a first order lag function.

13. A system as claimed in claim 12 where the time constant of the first order lag function is $$\tau = \frac{1}{k \cdot m_{exh}}$$

where $m_{exh}$, is the measured or estimated exhaust gas flow.

14. A system as claimed in claim 10 wherein said transfer function includes one or more of the following parameters: measured or estimated exhaust gas flow, catalyst temperature and ammonia level within said catalytic system/unit.

15. A system as claimed in claim 10 having means to provide said feedback value by means to apply a further transfer function to the output from second comparison means.

16. A system as claimed in claim 15 wherein said further transfer function is a first order lag filter.

17. A system as claimed in claim 10 wherein said reducing agent is urea.

18. A system as claimed in claim 10 including means to convert said command signal into a signal for urea injection/dosing means.

19. A system as claimed in claim 10 including means to supplement said signal for urea injection/dosing means with a further signal for urea injection/dosing means provided from open loop control.

20. A system as claimed in claim 19 wherein said open loop control has one or more input parameters selected from: NOx level output from exhaust and/or an engine; exhaust mass flow; and catalyst temperature.

21. A non-transitory computer readable medium or processor embodying a computer program or code adapted to perform the method of claim 1.

* * * * *